United States Patent [19]

Lindner et al.

[11] 4,191,705

[45] Mar. 4, 1980

[54] PROCESS FOR THE PREPARATION OF CARBONIC ACID ESTERS OF POLYESTER-POLYOLS

[75] Inventors: Christian Lindner, Cologne; Carlhans Süling; Herbert Bartl, both of Odenthal; Manfred Schreckenberg, Krefeld; Dieter Freitag, Krefeld-Traar; Klaus König, Leverkusen, all of Fed. Rep. of Germany

[73] Assignee: Bayer Aktiengesellschaft, Leverkusen, Fed. Rep. of Germany

[21] Appl. No.: 845,174

[22] Filed: Oct. 25, 1977

[30] Foreign Application Priority Data

Nov. 12, 1976 [DE] Fed. Rep. of Germany ....... 2651639

[51] Int. Cl.[2] ....................... C07C 68/00; C07C 69/96

[52] U.S. Cl. .................................... 260/463; 528/176; 528/272

[58] Field of Search ......................................... 260/463

[56] References Cited

U.S. PATENT DOCUMENTS

| | | | |
|---|---|---|---|
| 3,030,331 | 4/1962 | Goldberg | 260/860 |
| 3,030,335 | 4/1962 | Goldberg | 528/85 |
| 3,161,615 | 12/1964 | Goldberg | 528/204 |
| 3,169,121 | 2/1965 | Goldberg | 260/463 X |
| 3,207,814 | 9/1965 | Goldberg | 260/463 X |
| 3,220,976 | 11/1965 | Goldberg | 528/148 |
| 3,287,442 | 11/1966 | Caldwell et al. | 260/858 |
| 3,290,409 | 12/1966 | Munro | 260/860 |
| 3,444,141 | 5/1969 | Shima et al. | |
| 3,449,467 | 6/1969 | Wynstra | 260/463 X |
| 3,461,187 | 8/1969 | Cantrill | 260/873 |
| 3,549,682 | 12/1970 | Vernaleken et al. | 260/463 |
| 3,641,200 | 2/1972 | Matzner | 260/860 |
| 3,714,125 | 1/1973 | Shima et al. | |
| 3,843,708 | 10/1974 | Matzner | 260/463 |
| 3,843,752 | 10/1974 | Katayama et al. | 260/873 |
| 4,105,633 | 8/1978 | Swart et al. | |

FOREIGN PATENT DOCUMENTS

| | | | |
|---|---|---|---|
| 1964998 | 7/1977 | Fed. Rep. of Germany . | |
| 2235965 | 6/1973 | France . | |
| 898775 | 6/1962 | United Kingdom . | |
| 954500 | 4/1964 | United Kingdom . | |
| 965085 | 7/1964 | United Kingdom | 260/860 |
| 1139413 | 1/1969 | United Kingdom | 260/860 |
| 1190303 | 5/1970 | United Kingdom . | |
| 1270077 | 4/1972 | United Kingdom . | |
| 1422676 | 1/1976 | United Kingdom . | |

OTHER PUBLICATIONS

Goldberg, E. P., Journal of Polymer Science: Part C, No. 4, pp. 707–730 (1963).

Merrill, S. H., Journal of Polymer Science: vol. 55, pp. 343–352 (1961).

Merrill, S. H. et al., Journal of Polymer Science: Part A, vol. 3, pp. 2189–2203 (1965).

*Primary Examiner*—Lucille M. Phynes

*Attorney, Agent, or Firm*—Gene Harsh; Lawrence S. Pope

[57] ABSTRACT

The present invention relates to a process for the preparation of carbonic acid esters of polyester-polyols by transesterifying the polyols with carbonic acid aryl esters at elevated temperatures under vacuum in the presence of a catalyst. The reaction conditions are controlled to avoid the formation of by-products and the chain extension of the polyester-polyols. The present invention is also concerned with the polyester carbonic acid esters so formed, their use in producing polycarbonate block copolymers and the copolymers so produced. The copolymers may be produced by transesterifying the polyester carbonic acid esters with bisphenols and subjecting the bis-hydroxyaryl carbonates so formed to normal polycarbonate synthesis such as interfacial or melt polycondensation.

15 Claims, No Drawings

PROCESS FOR THE PREPARATION OF CARBONIC ACID ESTERS OF POLYESTER-POLYOLS

FIELD OF THE INVENTION

This invention relates to a process for the preparation of carbonic acid aryl esters of polyester-polyols and these carbonic acid aryl esters so formed.

BACKGROUND OF THE INVENTION

Polymonoaryl carbonates of polyhydric alcohols have been prepared by reacting.

1. the corresponding polychlorocarbonic acid esters of polyhydric alcohols with the corresponding phenols in the presence of hydrogen chloride-binding agents, 2. by reacting the corresponding polyalcohols with the corresponding chlorocarbonic acid esters of the phenols in the presence of hydrogen chloride binding agents or 3. by transesterifying the corresponding diaryl carbonates with the polyalcohols, splitting off, in each case, one mol of phenol per mol of diaryl carbonate. (Compare DT-OS (German Published Specification) 1,593,864, page 3, last paragraph to page 4,first paragraph).

While methods (1) and (2) have the disadvantage that hydrogen chloride binding agents must also be used, in stoichiometric amounts, method (3) has hitherto had the disadvantage that a mixture of high-molecular compounds is formed, since, for example, the formation of polycarbonates (compare Dt-AS (German Published Specification) 1,694,080, column 4) or the etherification of terminal OH groups (compare Japanese Auslegeschrift (Japanese Published Specification) 6,911,377 in Chemical Abstracts, Volume 71, 1969, page 34, abstract 922 48d) occur as competing reactions.

SUMMARY OF THE INVENTION

It has now been found, surprisingly, that higher-molecular weight or polymeric compounds which have average molecular weights ($\overline{M}n$) of above about 250, preferably above about 600, and which possess aliphatic hydroxyl groups can be reacted with carbonic acid aryl esters, in excess, to give mixed aliphatic-aromatic carbonic acid esters, this reaction proceeding smoothly, even at reaction temperatures up to about 200° C., without bis-phenylalkyl ether derivatives of the compounds employed, which derivatives result as the main product at reaction temperatures above 200° C., according to the above-mentioned Japanese Auslegeschrift (Japanese Published Specification) 6,911,377, being formed.

The molecular distribution determined by the starting materials is changed little by the process according to the invention, that is to say a polycondensation with linking of the polyesters via carbonic acid ester groups does not occur even in minor amounts. Cross-linking of the polyesters via carbonic acid ester bridges also is not observed.

The present invention thus relates to a process for the preparation of carbonic acid aryl esters of polyester-polyols with an average molecular weight ($\overline{M}n$) above about 250, preferably above about 600, and carbonic acid bis-aryl esters, characterized in that polyester-polyols with molecular weights $\overline{M}n$ (number average) above about 250, preferably above about 600, are heated with carbonic acid bis-aryl esters at temperatures between about 100° C. and 200° C., preferably between about 100° C. and 180° C., in a vacuum below 35 mm Hg, preferably between about 25 and 0.1 mm Hg, in the presence of catalysts, more than one mol of carbonic acid bis-aryl ester, preferably between about 1.25 mols and 2.25 mols of carbonic acid bis-aryl ester, being employed per mol of OH group of the polyester-polyol and the hydroxyaryl compound formed and the excess carbonic acid bis-aryl ester being distilled off.

The invention further relates to the carbonic acid aryl esters of polyester-polyols formed according the process of instant invention.

DETAILED DESCRIPTION OF THE INVENTION

Polyester-polyols which are particularly preferred according to the invention are polyester-diols. Thus the present invention particularly preferably relates to a process for the preparation of bis-aryl carbonates of polyester-diols and the polyester-diol-bis-aryl carbonates obtained according to the process of the instant invention.

The polyester-polyols used in the practice of the invention are, for example, reaction products of polyhydric, preferably dihydric and optionally also trihydric alcohols with polybasic, preferably dibasic, carboxylic acids. Instead of the free polycarboxylic acids, the corresponding polycarboxylic acid anhydrides or corresponding polycarboxylic acid esters of lower alcohols or their mixtures can also be used for the preparation of the polyester-polyols. The polycarboxylic acids can be of an aliphatic, cycloaliphatic, aromatic and/or heterocyclic nature and can be optionally substituted, for example, by halogen atoms, and/or unsaturated. Examples of these are: oxalic acid, malonic acid, succinic acid, adipic acid, suberic acid, azelaic acid, sebacic acid, phthalic acid, isophthalic acid, terephthalic acid, trimellitic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid and dimeric and trimeric fatty acids, such as oleic acid, optionally in a mixture with monomeric fatty acids. Possible polyhydric alcohols are, optionally in a mixture with one another, for example, ethylene glycol, propylene 1,2- and 1,3-glycol, butylene 1,4- and 2,3-glycol, hexane-1,6-diol, octane-1,8-diol, neopentylglycol, cyclohexanedimethanol (1,4-bis-hydroxymethylcyclohexane), 2-methyl-1,3-propanediol, glycerol, trimethylolpropane, hexane-1,2,6-triol, butane-1,2,4-triol, trimethylolethane, pentaerythritol and quinitol, and also thiodiglycol, diethylene glycol, triethylene glycol, tetraethylene glycol, polyethylene glycols, dipropylene glycol, polypropylene glycols, dibutylene glycol and polybutylene glycols.

The content of terminal hydroxyl groups and thus the "average" molecular weight $\overline{M}n$ is determined by choosing the defined excess of alcohol. Polyesters from aliphatic starting components are preferably employed.

Further, polyester-polyols are, for example, also those which are prepared by polymerization of a lactone, for example, of $\epsilon$-caprolactone or by a condensation reaction of a hydroxycarboxylic acid, for example, of $\omega$-hydroxycaproic acid, and a starting compound containing hydroxyl groups. $\overline{M}n$ is determined as described above.

The polyester-polyols which are suitable for the process according to the invention preferably have 2 to 4 hydroxyl groups, and particularly preferably 2 hydroxyl groups.

Carbonic acid bis-aryl esters used in the process of the invention are, in particular, those of the formula I:

$$Ar-O-\underset{\underset{O}{\|}}{C}-O-Ar \quad (I)$$

wherein

Ar is a substituted or unsubstituted aryl radical with 6 to 18 C atoms.

Possible substituents are, in particular, $C_1$–$C_4$-alkyls as well as nitro and halogen, such as, for example, chlorine or bromine. Examples of the esters are diphenyl carbonate, alkyl-substituted diphenyl carbonates, such as the di-toluyl carbonates, halogen-substituted diphenyl carbonates, such as the dichlorophenyl carbonates, dinaphthyl carbonate and alkyl-substituted and halogen-substituted dinaphthyl carbonates; in these, the nitro, alkyl or halogen substituents on the two phenyl nuclei or, respectively, the two naphthyl nuclei, of the diaryl carbonates can be identical or non-identical and can be symmetrical or unsymmetrical to one another. Thus, for example, phenyl toluyl carbonate, phenyl chlorophenyl carbonate, 2-toluyl-4-toluyl carbonate or 4-toluyl-4-chlorophenyl carbonate are also suitable for the process according to the invention.

Polyester bis-aryl carbonate in the sense of the invention are thus, in particular, those of the simplified formula II

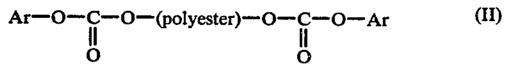

wherein

Ar has the meaning given above, and —(polyester)— is the divalent radical of one of the polyester-diols described above.

Suitable catalysts for the process according to the invention are basic transesterification catalysts, such as, for example, alkali metal phenolates or alkaline earth metal phenolates, alkali metal alcoholates or alkaline earth metal alcoholates and tertiary amines, such as, for example, triethylenediamine, morpholine, pyrrolidine, pyridine and triethylamine, or metal compounds, such as antimony trioxide, zinc chloride, titanium tetrachloride and titanic acid tetrabutyl ester.

The catalyst is used in amounts between about 10 ppm and 300 ppm, relative to the total weight of polyester-polyol and carbonic acid bis-aryl ester employed.

The catalyst may even be employed in amounts less than these when the starting compounds contain no basic impurities, if acid catalysts are used, and contain no acid impurities, if basic catalysts are used. So as to produce as little intrinsic color as possible in the carbonic acid esters, prepared according to the process of the present invention, as little as possible catalyst should be used.

The process according to the invention is preferably carried out in bulk, that is to say in the absence of solvents. However, solvents which are inert under the reaction conditions can also optionally be used, such as aliphatic hydrocarbons or aromatic hydrocarbons, which can contain, for example, nitro groups.

The reaction time depends on the reaction temperature and the nature and amount of catalyst used and is usually about ½ to 24 hours.

The hydroxyaryl compounds formed during the process according to the invention and the excess carbonic acid bisaryl esters can be removed after the reaction has ended by, in the case of a discontinuous process, separating off the hydroxyaryl compounds during the reaction by distillation and, after the reaction has ended, distilling off unreacted amounts of diaryl carbonate. If the transesterification reaction is carried out by a continuous procedure, the hydroxyaryl compounds are separated off from the reaction mixture by fractional distillation.

According to a particularly preferred embodiment of the process according to the invention, the reaction is carried out with sodium phenolate as the catalyst, using a mixture of polyester-diol and carbonic acid bis-aryl ester in the molar ratio of hydroxy group to carbonic acid bisaryl ester of about 1:2 at about 150° C.

The carbonic acid esters, obtained by the process according to the invention, in particular the bis-aryl carbonates of polyester-diols, are valuable components, for example, for new copolymeric compounds.

For example, the polyester bis-aryl carbonates obtained according to the invention can be transesterified by reaction with bisphenols. Suitable bisphenols are, in particular, bis-(hydroxyaryl)-alkanes, such as, for example, 2,2-bis-(4-hydroxyphenyl)-propane (bisphenol A).

The polyester bis-hydroxyaryl carbonates resulting from such transesterification, for example, the polyester bis-(4(4-hydroxyphenylisopropyl)-phenyl) carbonates may be mixed with bisphenol A and other components for the preparation of high-molecular weight aromatic polycarbonates, it being possible for this to take place both by the interfacial polycondensation procedure and the melt polycondensation procedure. Depending on the relative proportions and the nature of the starting components, plastic, more or less elastic polyester polycarbonates are obtained which can be used as sealing material. Furthermore, polyester polycarbonates of this type can be used as the starting material for hoses or as insulating material in electrotechnology.

The preparation of high-molecular block copolymers of this type by another synthesis path, for example, using other intermediate products, is described in DAS (German Published Specification) 1,162,559. Compared with the polyesterdiol bis-chloroformic acid esters used in DAS (German Published Specification) 1,162,559, the polyester bis-aryl carbonates obtained according to the invention have the advantage that, in contrast to these compounds, which react as an acid chloride, they are insensitive towards the action of moisture and can thus be stored for an unlimited period. The disadvantage of using polyester-diol bis-chloroformic acid esters for the synthesis of polyester polycarbonate block copolymers is, furthermore, that the chloroformic acid esters, although they react bifunctionally in relatively high yields, never do so completely because hydrolytic splitting of these acid chlorides cannot be completely suppressed. On the other hand, the polyesterdiol bis-aryl carbonates according to the invention can be converted directly, via the transesterification procedure, in a non-aqueous medium, into corresponding block copolymers without by-products which cannot be separated off after being obtained. Furthermore, it is possible, as mentioned above, also to react the compounds according to the invention with bisphenols, such as bisphenol A, according to the transesterification procedure so that the corresponding polyester bis-hydroxyaryl carbonates, optionally in a mixture with bisphenol A, can be further reacted to polyester polycarbonate block copolymers, for example, using phosgene as the bifunctional acid chloride. In the case of this synthesis path also, a hydrolytic splitting of high-molecular acid chlorides does not have an adverse effect.

The average molecular weights given in the examples below are number average $\overline{M}n$ and are obtained by determining the OH number.

The Staudinger index [η] given in the examples was measured in THF at 25° C. as is indicated in (dl/g).

For the definition of the Staudinger index see: H. G. Elias: "Makromoleküle" ("Macromolecules"), Hüthig & Wepf-Verlag Basle, page 265.

EXAMPLE 1

800 parts by weight of a polyester-diol of n-hexane-1,6-diol and adipic acid of average molecular weight $\overline{M}n$=800, 856 parts by weight of diphenyl carbonate and 0.05 part by weight of sodium phenolate are heated to 150° C. for 3.5 hours at 15 mm Hg while stirring and under nitrogen; 187 parts by weight of phenol are distilled off during this time. The excess diphenyl carbonate is then removed in a thin film evaporator at 200° C./0.1 mm Hg. A colorless, viscous oil is obtained.

[η] THF=0.072

OH number=0

C: found 63.3%; calculated: 66.5%

H: found 8.3%, calculated: 8.2%.

EXAMPLE 2

800 parts by weight of a polyester-diol of n-hexane-1,6-diol and adipic acid of average molecular weight $\overline{M}n$=800, 750 parts by weight of diphenyl carbonate and 0.1 part by weight of antimony trioxide are heated to 170° C. for 4.5 hours under 15 mm Hg, while stirring and under nitrogen, and 188 parts by weight of phenol are distilled off during this time. Excess diphenyl carbonate can then be removed analogously to Example 1. A colorless, viscous oil is obtained which is identical to the product prepared in Example 1.

EXAMPLE 3

1,000 parts by weight of a polyester-diol of adipic acid and equal molar amounts of ethylene glycol and butane-1,4-diol of average molecular weight $\overline{M}n$=1,900, 385 parts by weight of diphenyl carbonate and 0.1 part by weight of sodium phenolate are heated to 150° C. for 4.5 hours under 12 mm Hg, while stirring and under nitrogen; 100 parts by weight of phenol are distilled off during this time. The excess diphenyl carbonate is then removed in a thin layer evaporator at 200° C./0.1 mm Hg. A colorless, viscous oil is obtained.

[η] THF=0.112

OH number=0

C: found. 54.8%; calculated. 55.0%

H: found. 7.5%; calculated. 7.6%.

EXAMPLE 4

1,000 parts by weight of a polyester-diol of adipic acid and a mixture of n-hexane-1,6-diol/neopentylglycol in a molar ratio of 65/35 of average molecular weight $\overline{M}n$=1,828, 385 parts by weight of diphenyl carbonate and 0.12 part by weight of sodium phenolate are heated at 160° C. for 5 hours, under 12 mm Hg, while stirring and under nitrogen; 101 parts by weight of phenol are distilled off during this time. The excess diphenyl carbonate is then removed in a thin film evaporator at 200° C./0.1 mm Hg. A viscous oil is obtained.

[η] THF=0.118

OH number=0

C: found. 58.1%; calculated. 58.3%

H: found. 7.6%; calculated. 7.7%.

EXAMPLE 5

Preparation of a polyester polycarbonate 5.1 Preparation of a polyester bis-(bisphenol A) carbonate which also contains 18.5% by weight of bisphenol A and reaction products of bisphenol A and diphenyl carbonate.

446.3 parts by weight (0.2 mol) of the bisphenyl carbonate of a polyester-diol of hexane-1,6-diol and adipic acid of average molecular weight $\overline{M}n$=1,900, to which about a further 26.3 parts by weight of diphenyl carbonate are admixed (5.9% by weight residual content relative to the total amount) and which was prepared according to Example 1, 191.7 parts by weight of 2,2-bis-(4-hydroxyphenyl)-propane (bisphenol A) and 0.2 parts by weight of catalyst (the sodium bisphenolate of bisphenol A to bisphenol A=1:100) are heated at 150° C. for 4 hours under 0.05 mm Hg, while stirring and under a nitrogen atmosphere. 57.3 parts by weight of phenol are distilled off during this time.

5.2 Preparation of a polyester polycarbonate with a polyester proportion of 50% by weight.

151.5 parts by weight of this viscous oil from Example 5.1, dissolved in 1,725 parts by weight of methylene chloride, are added to a solution of 40.2 parts by weight of bisphenol A and 0.885 part by weight of p-tert.-butylphenol in 70 parts by weight of 45 percent strength NaOH and 1,300 parts by weight of distilled water. 58.3 parts by weight of phosgene are passed in the course of 30 minutes at 20°-25° C., while stirring and under a nitrogen atmosphere. During the passing in, 111 parts by weight of 45 percent strength NaOH are added dropwise at the same time so that the pH value remains constant at pH 13. After passing in the phosgene, 39.8 parts by weight of a 1 percent strength triethylamine solution are added and the mixture is stirred for 1 hour. The organic phase is separated off and washed successively with 2 percent strength phosphoric acid and finally with distilled water until free from electrolyte. After separating off the water, the organic phase can be worked up by the following process:

5.2.1 A high strength (about 30-40% by weight) polymer solution is obtained by distilling off the $CH_2Cl_2$ down to a certain concentration or by adding chlorobenzene to the organic phase and distilling off the entire methylene chloride. The polyester polycarbonate gels by subsequently slowly evaporating off the residual methylene chloride or the chlorobenzene and can be further worked up to a powder grain mixture. The resulting polyester polycarbonate is dried for 48 hours at 50° C. and 24 hours at 100° C. in vacuo. 5.2.2 A finely divided solid product is obtained by distilling off the solvent, drying in a vacuum drying cabinet at about 80°-110° C. and under 15 mm Hg and subsequent grinding.

5.2.3 By precipitating the polyester polycarbonate from the organic phase with, for example, methanol, ethanol, isopropanol, acetone, aliphatic hydrocarbons and cycloaliphatic hydrocarbons and subsequent drying in a vacuum drying cabinet at 80°–110° C. and under 15 mm Hg.

5.2.4 By concentrating the organic phase in an evaporation extruder and subsequent extrusion at about 160°–240° C. under the conditions which are known for polycarbonate extrusion.

The relative viscosity of the polyester polycarbonate obtained according to 5.2.1–5.2.4 is 1.46 (measured in $CH_2Cl_2$ at 25° C. and c=5 g/l). According to determination by gel chromatography, the polyester polycarbonate exhibits a maximum at 56,000. It contains 50% by weight of polyester and a polycarbonate proportion of 50% by weight. Some mechanical properties of a film cast from methylene chloride are:

Tensile strength 227 (MPA) (measured according to DIN 53,455)

Elongation at break 413% (measured according to DIN 53,455)

According to differential thermoanalysis, the granulated polyester polycarbonate exhibits a glass transition temperature (transformation temperature) of the polyester constituent of −28° C., a glass transition temperature (transformation temperature ) of the amorphous polycarbonate constituent of 125° C. and a crystallite melting point of the crystalline polycarbonate constituent of about 190° C. The fusion enthalpy of the crystalline polycarbonate constituent is between 2.5 and 5.5 cal/g of polymer.

Investigations by gel chromatography were carried out in tetrahydrofurane with Styragel columns (separation range: $1.5\times10^5$ Å, $1\times10^5$ Å, $3\times10^4$ Å and $2\times10^3$ Å) at room temperature. The calibration of bisphenol A polycarbonate was used for the determination. Compared with the $\overline{M}w$ determination by the light scattering method, no large deviations were observed.

The differential thermoanalysis (DTA) was carried out with the apparatus "DuPont, Model 900". For the interpretation of the transformation temperature, the approximate center of the softening range, according to the tangent method, was chosen and for the crystallite melting point the approximate center of the endothermic peak of the melting curve was chosen.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of a carbonic acid aryl ester of a polyester-polyol from a polyester-polyol having an average molecular weight ($\overline{M}n$) above about 250 and a carbonic acid bis-aryl ester, comprising heating the polyester-polyol with the carbonic acid bis-aryl ester at a temperature from about 100° C. to 200° C. at a pressure less than about 35 mm Hg in the presence of a catalyst, more than one mol of carbonic acid bis-aryl ester being employed per mol of OH-group, and distilling off the hydroxyaryl compound formed and the excess carbonic acid bis-aryl ester.

2. The process of claim 1 wherein the polyester-polyol has an average molecular weight ($\overline{M}n$) above about 600.

3. The process of claim 1 wherein the reaction temperature is from about 100° to 180° C.

4. The process of claim 1 wherein the pressure is from about 0.1 mm to 25 mm Hg.

5. The process of claim 1 wherein from about 1.25 to 2.25 mols of carbonic acid bis-aryl ester are employed.

6. The process of claim 1 wherein the polyester-polyol is a polyester-diol.

7. The process of claim 1 wherein the polyester-polyol is a reaction product of polyhydric alcohol with a poly basic carboxylic acid.

8. The process of claim 1 wherein the polyester-polyol is prepared by polymerizing a lactone.

9. The process of claim 1 wherein the carbonic acid bis-aryl ester is a compound of the general formula

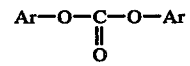

wherein Ar is a substituted or unsubstituted aryl radical having 6 to 18 C atoms.

10. The process according to claim 1 wherein the catalyst is a basic transesterification catalyst.

11. The process of claim 1 wherein the amount of catalyst is from about 10 ppm to 300 ppm relative to the total weight of polyester-polyol and carbonic acid bis-aryl ester.

12. The process of claim 1 wherein the heating is carried out in bulk or in the presence of an inert solvent.

13. The process of claim 1 wherein the catalyst is sodium phenolate, the polyester-polyol is a polyester-diol, the molar ratio of hydroxy groups to carbonic acid bis-aryl ester is about 1:2, and the reaction temperature is about 150° C.

14. The product of the process of claim 1.

15. Compounds of the formula

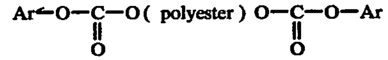

wherein

Ar is a substituted or unsubstituted aryl radical having 6 to 18 carbon atoms, "—(polyester)—" is a bivalent radical of a polyester-polyol having a molecular weight ($\overline{M}n$) greater than 250.

* * * * *

4,191,705.—*Christian Lindner*, Cologne; *Carlhans Suling; Herbert Bartl*, both of Odenthal; *Manfred Schreckenberg*, Krefeld; *Dieter Freitag*, Krefeld-Traar; and *Klaus Konig*, Leverkusen, Germany. PROCESS FOR THE PREPARATION OF CARBONIC ACID ESTERS OF POLYESTER-POLYOLS. Patent dated Mar. 4, 1980. Disclaimer filed June 6, 1984, by the assignee, *Bayer Aktiengesellschaft*.

Hereby enters this disclaimer to claim 15 of said patent.

[*Official Gazette August 21, 1984.*]